US006543787B1

(12) United States Patent
Inciong

(10) Patent No.: US 6,543,787 B1
(45) Date of Patent: Apr. 8, 2003

(54) BOUNDARY GASKET WITH WAFFLE PATTERN SEALING BEADS

(75) Inventor: Josefino T. Inciong, Skokie, IL (US)

(73) Assignee: Dana Corporation, Toledo, OH (US)

( * ) Notice: Subject to any disclaimer, the term of this patent is extended or adjusted under 35 U.S.C. 154(b) by 13 days.

(21) Appl. No.: 09/819,535

(22) Filed: Mar. 28, 2001

(51) Int. Cl.[7] ............................................... F02F 11/00
(52) U.S. Cl. ...................... 277/593; 277/594; 277/596; 277/626; 277/649
(58) Field of Search ............................... 277/593, 594, 277/596, 626, 648, 649

(56) References Cited

U.S. PATENT DOCUMENTS

| 871,178 A | 11/1907 | Ostrander | |
|---|---|---|---|
| 2,616,736 A | 11/1952 | Smith | 288/23 |
| 3,032,062 A | 5/1962 | Blahnik | 137/593 |
| 3,794,333 A | * 2/1974 | Czernik et al. | |
| 4,181,313 A | * 1/1980 | Hillier et al. | |
| 4,535,996 A | 8/1985 | Cardis et al. | 277/1 |
| 4,719,065 A | 1/1988 | Gibbon | 264/135 |
| 4,817,967 A | 4/1989 | Belter | 277/199 |
| 4,846,482 A | 7/1989 | Blodgett et al. | 277/235 B |
| 4,880,669 A | * 11/1989 | Dorn et al. | 427/210 |
| 4,889,167 A | * 12/1989 | Morris | 138/99 |
| 4,997,193 A | 3/1991 | Czernik | 277/233 |
| 5,222,745 A | 6/1993 | Akbar et al. | 277/207 R |
| 5,536,023 A | 7/1996 | Surbrook et al. | 277/235 B |
| 5,618,047 A | * 4/1997 | Belter | |
| 5,662,337 A | * 9/1997 | Surbrook et al. | |
| 6,003,878 A | * 12/1999 | Noble et al. | 277/596 |
| 6,173,966 B1 | * 1/2001 | Noble et al. | 277/596 |

FOREIGN PATENT DOCUMENTS

DE 3831415 * 3/1990
JP 9-112700 * 5/1997

* cited by examiner

Primary Examiner—Anthony Knight
Assistant Examiner—Alison K. Pickard
(74) Attorney, Agent, or Firm—Rader, Fishman & Grauer, PLLC

(57) ABSTRACT

A unitary boundary gasket adapted for sealing between flanged portions of two axially mated surfaces of rigid metallic members, such as between an engine block and an associated engine oil pan. In one preferred form, the gasket has a rectilinearly shaped annular body, and is formed of a one-piece radially outermost rigid metallic carrier having a first axial thickness, and adhesively bonded to a one-piece radially innermost elastomeric sealing body. The sealing body, bonded to the metallic carrier at the radially innermost edge of the carrier, includes a plurality of spaced apertures adapted for accommodating passage of bolt members for fastening said flanged portions together about the gasket body. Intermediate the apertures are longitudinally extending waffle pattern regions designed for sealing against leakage of fluids between said apertures. In one preferred form, a plurality of sealing beads extend medially between each waffle pattern region.

10 Claims, 2 Drawing Sheets

BOUNDARY GASKET WITH WAFFLE PATTERN SEALING BEADS

BACKGROUND OF THE INVENTION

1. Field of Invention

The present invention relates to improved bolted-on automotive gasket assemblies for internal combustion engines, and more particularly to improved gaskets applied between the bottom flange portions of such engines and the oil pan structures secured thereto.

2. Description of the Prior Art

Those skilled in the art will appreciate the difficulty of maintaining a good quality oil seal between the bottom flange of an internal combustion engine and the oil pan secured to the flange. Typically, the pan is secured to a flange which has portions in various planes, some of the portions including semi-cylindrical sealing surfaces, such as, for example, the portion situated at a centrally located rear main bearing cap of a typical vehicle. Indeed, most oil pan covers have two generally longitudinally extending flat flange surfaces which mate with engine mounting flanges, and two generally semi-circular concave ends adapted to accommodate correspondingly convex mating surfaces of a bearing cap and a timing chamber cover, respectively. Thus, the overall environment for sealing oil pan structures is generally difficult at best.

Unitary prior art molded rubber gaskets have been employed to seal such described irregular boundary sealing criteria. However, such gaskets have main body portions defining bolt or fastener apertures and include concave ends for sealing the noted semi-circular ends. Such gaskets are also difficult to install to the extent that they are limp; i.e. without stiffness. Moreover, such gaskets are also prone to splitting problems at the fastener holes.

As a result, traditional gaskets employed to seal such areas have been subject to considerable redesign efforts in recent years, particularly for aftermarket replacements. One replacement application is for an original equipment gasket consisting of a cork material. Gasket materials suggested as replacements have included thermoset or thermoplastic elastomers, or possibly even soft plastic resins, such as unfilled nylon. In any event, the seal must be robust enough to avoid premature deterioration, and must be resilient enough to seal areas that may be quite narrow. In addition, some attention is needed to enhance sealing effectiveness in regions between bolt or fastener apertures, a recognized source of potential leakage.

SUMMARY OF THE INVENTION

The present invention is an improved boundary gasket for sealing between flanged portions of axially mated rigid surfaces such as an oil pan and associated engine block. The gasket constitutes a unitary, rectilinearly shaped molded elastomeric sealing body that includes at least one unitary sealing bead on one facial side thereof. The bead is integral with, and extends circumferentially about, the entire boundary of the gasket on said one side. The bead is radially spaced from a plurality of spaced apertures adapted for accommodating passage of bolt members about the gasket body for fastening flanged portions of the oil pan and engine block together. In a preferred embodiment, the bead provides the primary sealing function for the engine block side of the gasket. The gasket incorporates a one-piece circumferentially extending metallic carrier at its radially outermost edge adapted for imparting rigidity to the gasket body for facilitating handling and installation. The carrier, which also acts as a bolt crush limiter, is adhesively bonded to the unitary elastomeric sealing body at the radially outermost edge of the body.

On the oil pan side of the gasket, waffle pattern sealing regions between apertures are particularly designed for sealing against oil pan flanges having undulating or non-flat surfaces, i.e., surfaces incorporating both positive and negative embossments. For this purpose, the side of the gasket adapted to mate against the oil pan flange contains only segmented beads, positioned about the radially inward edges of the bolt apertures. In the preferred embodiment the beads are integrally formed in the elastomeric body of the gasket. Each region of the gasket between the apertures on the oil pan side includes a waffle pattern also integrally formed within the elastomeric body of the gasket, and the segmented beads extend up to and are contiguous with the lateral boundaries of each waffle pattern region. In a preferred form, each waffle pattern region extends longitudinally over at least 75% of the spanned distance between any two bolt apertures.

The sum of the thicknesses of the waffle pattern regions and the at least one continuous bead on the engine block side comprises an axial thickness greater than that of the carrier; thus upon the tightening by bolt members, the elastomeric material of the bead will only be crushed or compressed to the limiting axial thickness of the carrier.

Finally, the same preferred embodiment of the gasket has two longitudinally extending, flat, side portions, with arcuate end portions contiguously joining the side portions for accommodating semi-circular members situated immediately adjacent the oil pan.

DETAILED DESCRIPTION OF THE PREFERRED EMBODIMENTS

Figure 1:
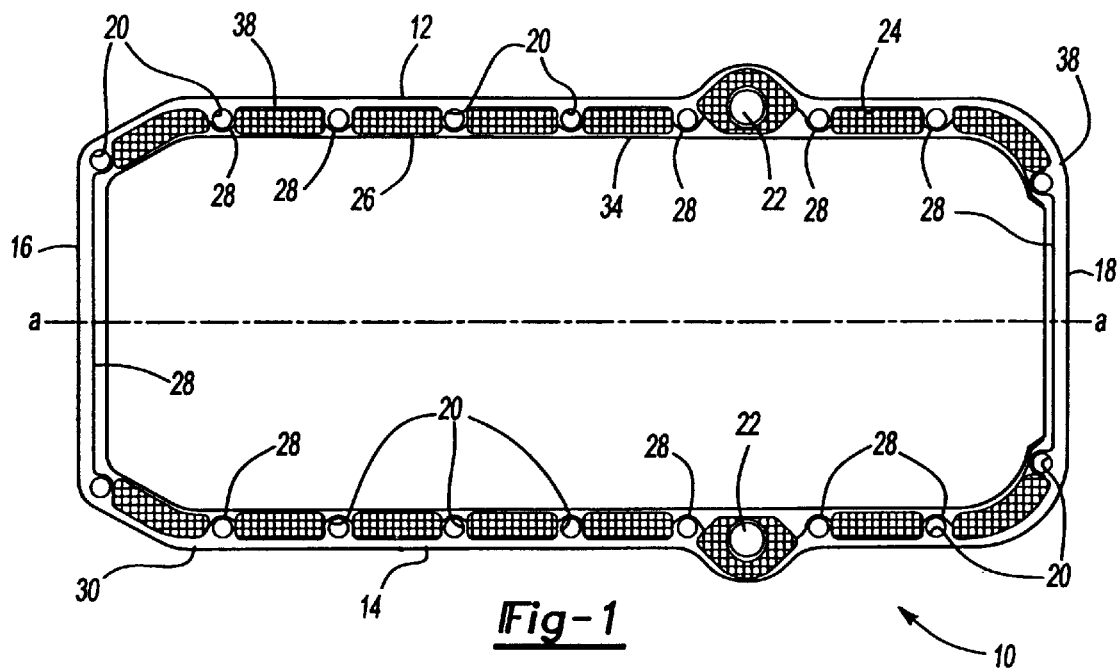
FIG. 1 is a plan view of one preferred embodiment of the boundary gasket that incorporates a plurality of the waffle pattern regions of the present invention.

Referring initially to FIG. 1, a preferred embodiment of an oil pan boundary gasket 10 has an axis "a—a" which runs parallel to the axis of an associated vehicle, and includes two longitudinally extending planar or flat sides 12 and 14, representing left and right vehicular engine sides, respectively. The flat sides 12 and 14 run generally parallel to the axis but in different planes, and are bounded by arcuate ends 16 and 18 which join the sides 12 and 14 together contiguously to form the generally rectilinearly shaped gasket 10. A plurality of spaced apertures 20 is disposed about the rectilinear gasket body. The apertures 20 are adapted to accommodate bolt members (not shown) for securement of the gasket 10. Those skilled in the art will appreciate that single right and left side apertures 22 are provided for accommodating either a left or right side engine oil dipstick (not shown). FIG. 1 depicts the oil pan or bottom side 38 of the gasket 10.

Figure 2:
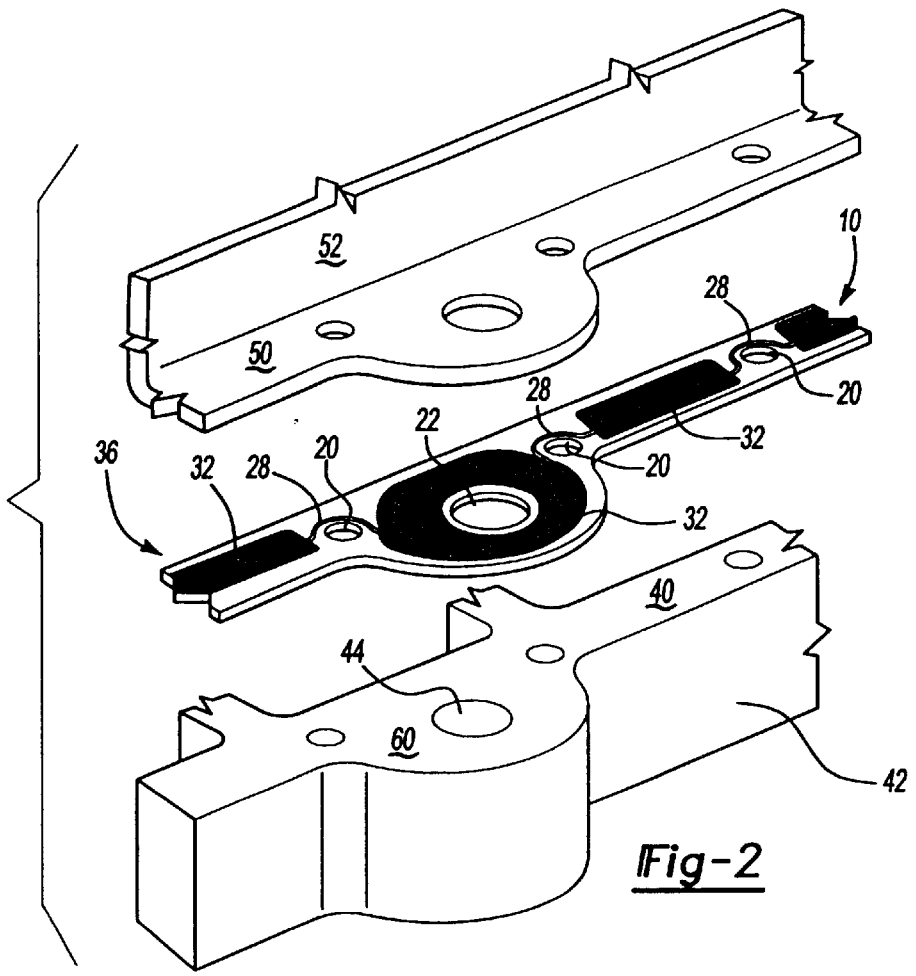
FIG. 2 is an exploded fragmentary perspective, as well as a cross-sectional, view of a portion of the boundary gasket, depicting the gasket portion interposed between respective portions of an internal combustion engine flange and a mating flange of an oil pan, prior to securement together of all flanged structures by bolts.

Referring now specifically to FIG. 2, a fragmentary portion 36 of the gasket 10 is depicted (bottom side up) as part of an exploded view of the pre-assembly positioning of the fragmentary portion 36 between complementary mating fragmentary portions of an oil pan flange 50 of an oil pan 52 and an engine flange 40 of the engine block 42. A plurality of waffle pattern regions 32 are shown provided in spaced-apart fashion along the boundary of the gasket 10, particularly in areas between bolt apertures 20. One of such regions 32 is provided on the side 38 around an oil dipstick aperture 22 to seal in a narrow circular sealing space 60 as shown.

Figure 3:
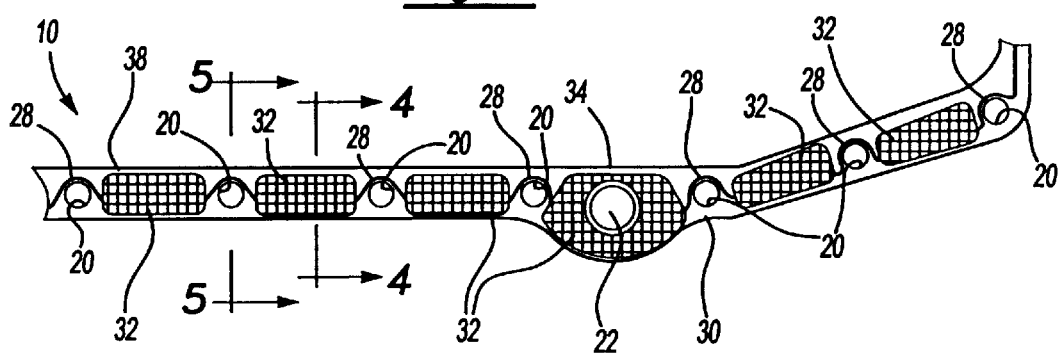
FIG. 3 is an enlarged plan view of a similar fragmentary portion of the boundary gasket of the same preferred embodiment, depicting details of relative spacing of the waffle pattern areas between bolt apertures.

Referring now also to FIG. 3, the rectilinearly shaped body of the gasket 10 includes a one-piece rigid carrier 30, preferably formed of metal such as stamped steel, to act as a stiffening member for the gasket body as well as a bolt crush limiter. The carrier 30 extends circumferentially about the radially outermost edge or boundary of the gasket 10, as shown, and has radially inner boundaries extending into areas proximal to the bolt apertures as shown. Adhesively bonded to the radially innermost edge 24 (see FIGS. 4 and 5) of the carrier 30 is an elastomeric sealing body 26 which contains the apertures 20 and has a radially innermost edge 34. A plurality of sealing bead segments 28 extends between each aperture 20 and the edge 34, and extends contiguously between each waffle pattern region 32, as shown.

The plurality of spaced waffle pattern regions 32 is more clearly shown in FIGS. 2 and 3. For greatest effectiveness, the preferred arrangement of regions 32 should span at least approximately 75 percent of the spacing between bolt apertures. The thickness or height "T" of the waffle pattern regions 32 relative to the thickness "t" of the carrier 30 can be seen in FIG. 4. The height of the waffle pattern regions must be sufficient to effectively seal an oil pan 52 (FIG. 2) having undulations, i.e. both negative and positive embossments, in its flange 50. Thus in the preferred embodiment; the waffle pattern regions 32 are effective to prevent oil leakage between the gasket 10 and oil pan flange 50, and are not necessary for sealing the normally flat engine flange 40 side of the gasket 10, which contains at least one continuous sealing bead 70 (FIGS. 4 and 5), and in the preferred embodiment herein described also contains a second continuous bead 72 in side 39 of the gasket 10.

Figure 4:
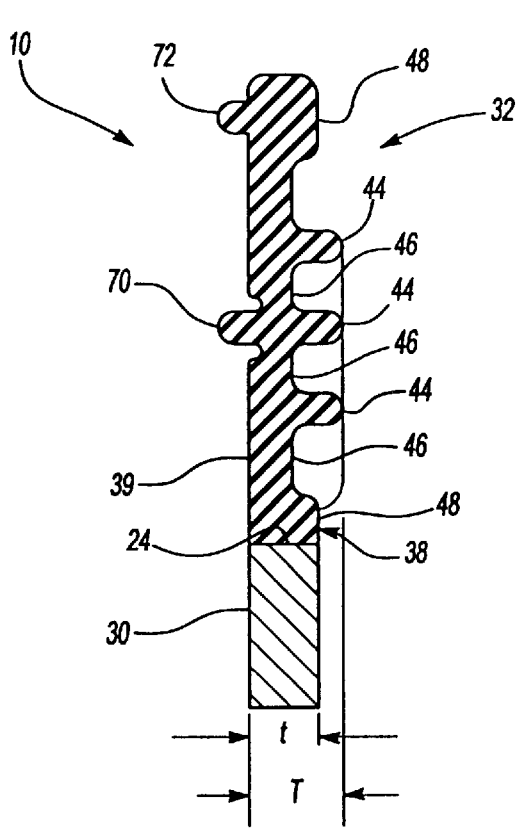
FIG. 4 is a view through one of the waffle pattern area as depicted along lines 4—4 of FIG. 3.

Referring now specifically to FIG. 4, the cross-section of one of the waffle pattern regions 32 reveals a series of longitudinally extending vertical ridges 44 on the bottom or oil pan side 38 of the gasket 10. The ridges 44 which have approximately the same height or thickness as the unitary sealing bead 70 which also extends about the gasket 10 on the upper or engine side 39 thereof The vertical ridges 44 border a series of substantially rectangular valleys 46. It will be noted that the borders 48 of the waffle pattern regions 32 have approximately the same thickness as the carrier 30. Substantial distortions of the ridges 44 can be accommodated under compression loads imposed thereon, particularly by positive embossments in the oil pan flange 50. Those skilled in the art will appreciate that the segmented sealing beads 28 will extend longitudinally between all waffle pattern regions 32, about the entire gasket boundary, medially connecting each region 32, and will thus each extend generally parallel to the longitudinally extending borders 48 of each region 32.

Figure 5:
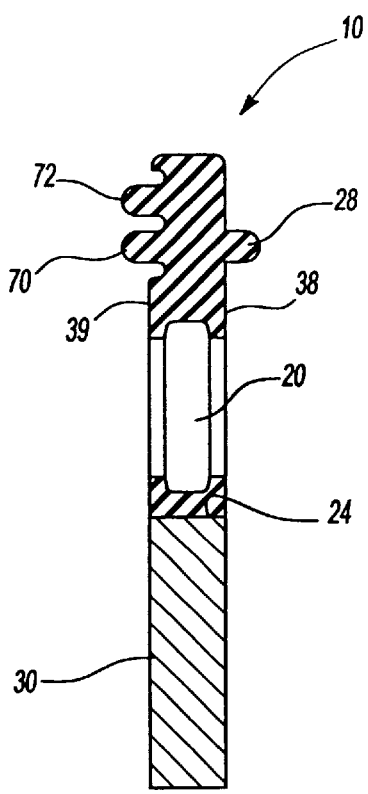
FIG. 5 is a view through one of the bolt apertures of the subject gasket, along lines 5—5 of FIG. 3.

Referring now to FIG. 5, the cross-section of a representative bolt aperture 20 reveals the passage of a segmented bead 28 about the radially inner or bottom circumference of the aperture 20 (also shown in FIG. 3). However, with respect to both cross sections shown in FIGS. 4 and 5 (i.e. of region 32 and of aperture 20 respectively), the top or engine flange side 39 of the gasket includes the noted primary unitary bead 70 that overlies the bottom segmented bead 28 about the entire extent of the gasket 10. In addition, the secondary unitary bead 72 is spaced radially inwardly of the top bead 70 to provide a backup seal against leakage between gasket 10 and engine flange 40. Thus, overlying each segmented bead 28 positioned about the entire gasket on the upper side 38 thereof, is at least a corresponding unitary bead 70 against the engine flange to establish a primary seal. The waffle regions 32, in conjunction with the primary sealing beads 28 and 70, are effective to provide a greatly improved boundary seal. In some applications the secondary sealing bead 72 may not be required.

It is to be understood that the above description is intended to be illustrative and not limiting. For example, some applications will not require the use of sealing bead segments 28 that extend between each waffle pattern region 32. Many other embodiments will be apparent to those of skill in the art upon reading the above description. Therefore, the scope of the invention should be determined, not with reference to the above description, but with reference to the appended claims, along with the full scope of equivalents to which such claims are entitled.

What is claimed is:

1. A unitary boundary gasket adapted for sealing between flanged portions of two axially mated surfaces of rigid metallic members, said flanged portions each containing a plurality of spaced bolt apertures; said gasket comprising:
   a) a one-piece radially outermost rigid metallic carrier having a first axial thickness,
   b) a one-piece radially innermost elastomeric sealing body bonded to said metallic carrier at the radially innermost edge of said carrier,
   c) said sealing body comprising a plurality of spaced apertures adapted for mating registration with apertures of said flanged portions, said apertures adapted for accommodating passage of bolt members for fastening said flanged portions together about said gasket, and
   d) said elastomeric sealing body further comprising a plurality of integrally formed waffle pattern regions extending longitudinally between said bolt apertures, each of said regions being presented only on one side of said gasket, each region being spaced away from any given bolt aperture,
   e) said elastomeric sealing body further comprising a plurality of segmented sealing beads extending longitudinally between each of said waffle pattern regions on said one side of said gasket, each of said segmented sealing beads being contiguous with the lateral boundaries of each of said regions.

2. The unitary boundary gasket of claim 1 further comprising two longitudinally extending flat side portions, and arcuate end portions contiguously joining said side portions.

3. The unitary boundary gasket of claim 2 wherein said longitudinally extending flat side portions are in different planes.

4. The unitary boundary gasket of claim 1 wherein each of said waffle pattern regions comprises a longitudinally extending span of approximately 75 percent of the distance between said bolt apertures.

5. The unitary boundary gasket of claim 1 wherein said plurality of segmented sealing beads extend circumferentially about the gasket and radially outwardly of each of said spaced apertures.

6. The unitary boundary gasket of claim 1 wherein the thickness of each of said waffle pattern regions is approximately equal to that of each sealing bead.

7. The unitary boundary gasket of claim 6 wherein each said segmented sealing bead is positioned immediately above a second unitary sealing bead positioned on the opposite side of said gasket.

8. The unitary boundary gasket of claim 7 wherein said metallic carrier comprises a bolt crush resistant medium, wherein the radially inner boundaries of said carrier extend into areas proximal to said bolt apertures.

9. The unitary boundary gasket of claim 1 wherein said metallic carrier is a stiffening member for said gasket.

10. The unitary boundary gasket of claim 9 wherein said metallic carrier is formed of stamped steel.

* * * * *